United States Patent
Last et al.

(10) Patent No.: US 11,623,185 B2
(45) Date of Patent: Apr. 11, 2023

(54) STIRRING ELEMENT DEVICE

(71) Applicant: EKATO Ruehr-und Mischtechnik GmbH, Schopfheim (DE)

(72) Inventors: Wolfgang Last, Loerrach (DE); Dennis Bird, Wendelstein (DE)

(73) Assignee: EKATO Rühr-und Mischtechnik GmbH, Schopfheim (DE)

( * ) Notice: Subject to any disclaimer, the term of this patent is extended or adjusted under 35 U.S.C. 154(b) by 376 days.

(21) Appl. No.: 16/750,209

(22) Filed: Jan. 23, 2020

(65) Prior Publication Data

US 2020/0238231 A1 Jul. 30, 2020

(30) Foreign Application Priority Data

Jan. 25, 2019 (DE) ................... 10 2019 101 934.6

(51) Int. Cl.
| | | |
|---|---|---|
| *B01F 23/00* | (2022.01) | |
| *B01F 23/233* | (2022.01) | |
| *B01F 27/71* | (2022.01) | |
| *B01F 27/113* | (2022.01) | |

(52) U.S. Cl.
CPC ...... *B01F 23/2331* (2022.01); *B01F 27/1133* (2022.01); *B01F 27/71* (2022.01); *B01F 23/23311* (2022.01); *B01F 23/23314* (2022.01); *B01F 23/23365* (2022.01)

(58) Field of Classification Search
CPC ............ B01F 23/2331; B01F 23/23311; B01F 23/23314; B01F 23/23365; B01F 27/11; B01F 27/1133; B01F 27/2122; B01F 27/2123; B01F 27/71; B33Y 80/00

USPC ............................ 261/87; 366/102–104, 343
See application file for complete search history.

(56) References Cited

U.S. PATENT DOCUMENTS

| | | | | |
|---|---|---|---|---|
| 3,782,702 A | * | 1/1974 | King ................... | B01F 23/2368 261/87 |
| 4,454,078 A | * | 6/1984 | Engelbrecht ........ | B01F 23/2334 261/93 |
| 4,925,598 A | * | 5/1990 | Kivisto ................... | B01F 25/21 261/87 |
| 5,198,156 A | * | 3/1993 | Middleton ............ | B01F 23/233 416/243 |
| 5,458,816 A | * | 10/1995 | Ebner ..................... | B01F 25/21 261/87 |
| 6,394,430 B1 | | 5/2002 | Forschner et al. | |

(Continued)

FOREIGN PATENT DOCUMENTS

| | | |
|---|---|---|
| EP | 0993862 A1 | 4/2000 |
| EP | 1243313 A2 | 9/2002 |
| WO | 99/15265 A2 | 4/1999 |

OTHER PUBLICATIONS

Office Action dated Oct. 23, 2019 issued in the corresponding DE patent application No. 10 2019 101 934.6 (with English translation attached).

*Primary Examiner* — Anshu Bhatia
(74) *Attorney, Agent, or Firm* — Posz Law Group, PLC

(57) ABSTRACT

A stirrer device, especially for the mixing of a fluid with at least one other fluid, includes at least one fluid dispersing unit able to turn about an axis of rotation, having at least one exit opening for at least one fluid discharge, and the stirrer device has at least one optimization unit, which in at least one operating state increases at least a differential pressure at the exit opening.

23 Claims, 5 Drawing Sheets

(56) References Cited

U.S. PATENT DOCUMENTS

Figure 1:
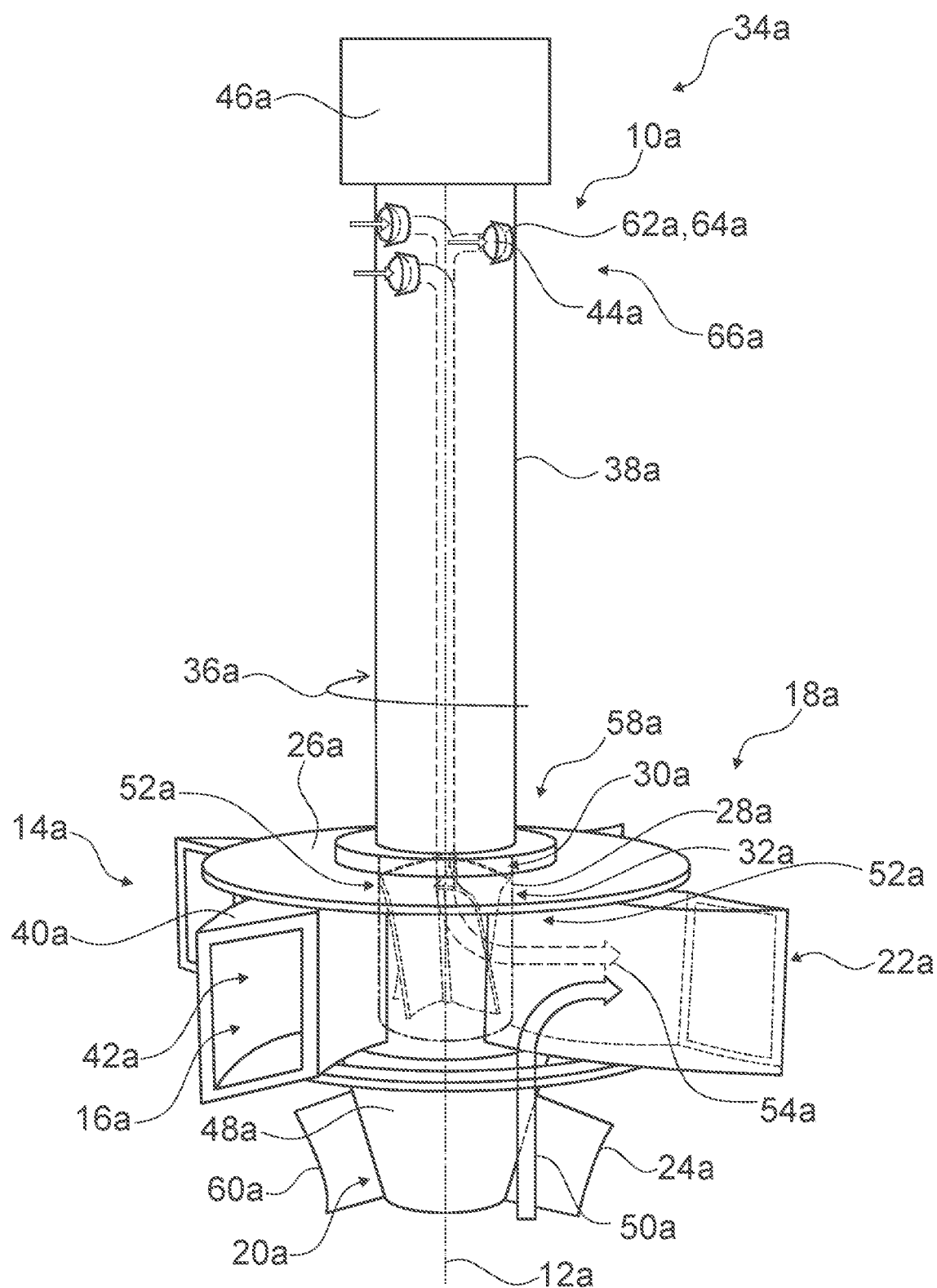

| | | | |
|---|---|---|---|
| 6,814,344 B2 * | 11/2004 | Peterson | B01F 23/2331 366/326.1 |
| 2009/0110559 A1 | 4/2009 | Bell et al. | |
| 2009/0213684 A1 * | 8/2009 | Bell | B01F 25/4521 366/102 |
| 2014/0071788 A1 * | 3/2014 | Wang | B01F 27/15 366/279 |

* cited by examiner

STIRRING ELEMENT DEVICE

CROSS REFERENCE TO RELATED APPLICATION

This application is based on and incorporates herein by reference German Patent Application No. 10 2019 101 934.6 filed on Jan. 25, 2019.

PRIOR ART

The invention relates to a stirrer device according to the preamble of claim 1.

From EP 0 993 862 A2 there is already known a stirrer device, which disperses a gas in a liquid. The gas is suctioned in through a hollow shaft and brought into the liquid in the radial direction through exit openings.

Moreover, there is known from EP 1 243 313 A2 a stirrer and a method for mixing a gas and a liquid, or a liquid with another liquid, wherein the stirrer comprises a hollow shaft for suctioning in the gas or liquid being mixed, and it sets in motion a suctioning process by means of generating a negative pressure difference, delivering the gas or liquid being mixed through outlet openings to the outside.

The problem which the invention proposes to solve is to provide a device of this kind with improved dispersing properties. The problem is solved according to the invention by the features of claim 1, while advantageous embodiments and modifications of the invention can be found in the dependent claims.

BENEFITS OF THE INVENTION

The invention is based on a stirrer device, especially for the mixing of a fluid with at least one other fluid and/or especially for the dispersing of a fluid in at least one other fluid, having at least one fluid dispersing unit able to turn about an axis of rotation, having at least one exit opening for at least one fluid discharge.

It is proposed that the stirrer device comprises at least one optimization unit, which in at least one operating state, especially in at least one operating state with fixed speed of rotation of the fluid dispersing unit, increases at least a differential pressure at the exit opening.

In this way, dispersing properties can be advantageously improved. Especially advantageously, a material transfer of the fluid, especially as dispersed phase, into the other fluid, especially as dispersing agent, can be optimized. A dispersing performance can be advantageously enhanced. In particular, a uniform dispersion can be produced. Moreover, multiple fluids can be mixed with each other, especially those having different phases, especially liquid phases. Furthermore, a phase boundary surface between the fluid and the other fluid can be enhanced. In particular, an optimized fluid flow can be created by the stirrer device and especially inside the stirrer device. Preferably, costs for the producing of a dispersion can be minimized. Advantageously, maintenance and/or operating costs can be minimized. Moreover, energy and/or material and/or raw material costs can be minimized. Advantageously, a chemical reaction and/or the speed of a chemical reaction between the fluid or at least one component of the fluid and the other fluid or at least one other component of the other fluid can be favoured and/or increased.

By a "stirrer device" is meant in particular a component, especially a functioning component, especially a design and/or functional component, of a stirrer, such as a mixer and/or a disperser and/or a stirring system. In particular, the stirrer device may comprise the entire stirrer. Especially advantageously, the stirrer device is adapted to be turned about an axis of rotation, especially the axis of rotation of the fluid dispersing unit, especially during a stirring process and/or a mixing process and/or a dispersing process. Preferably, the fluid dispersing unit and especially the stirrer device has point symmetry when viewed along the axis of rotation, especially regarding a longitudinal extension of the axis of rotation. Advantageously, in a mounted state, the axis of rotation runs parallel to a vertical direction, preferably in the direction of an acting gravity force, especially in a normal operating state of the stirrer, while the vertical direction preferably runs perpendicular to a base.

By an "exit opening" is meant in particular an opening at which the fluid emerges in the operating state from the fluid dispersing unit and/or is delivered from the fluid dispersing unit, thereby in particular initiating the dispersing process. In particular, the exit opening when viewed at least substantially perpendicular to a principal plane of extension of the exit opening can have a square and advantageously a rectangular shape. Alternatively, the exit opening when viewed at least substantially perpendicular to a principal plane of extension of the exit opening can have a polygonal, an oval, a round or a semicircular shape.

By a "fluid dispersing unit" is meant in particular a unit which in the operating state distributes and/or disperses the fluid, advantageously directly, especially in the form of a dispersed phase, into the other fluid, which acts in particular as a dispersion agent, and which produces a dispersion in particular by expenditure of energy, especially by stirring, shaking, beating, injecting, and/or by vibrations, especially acoustical ones.

In particular, the fluid dispersing unit comprises at least one disperser, which comprises in particular the exit opening. In particular, the disperser is curved in shape, especially in a plane of rotation of the fluid dispersing unit. Advantageously, the disperser extends radially outward from a region of the fluid dispersing unit near its centre. In particular, the disperser is hollow and it defines at least one fluid duct. In particular, the disperser is formed as a single piece with a stirring blade of the stirrer device. Advantageously, the disperser is formed as a stirring blade.

Advantageously, the principal plane of extension of the exit opening is oriented at least substantially against a direction of rotation of the fluid dispersing unit in at least one operating state of the fluid dispersing unit. By "at least substantially against" is meant in this context in particular that a surface normal to one plane or a principal plane of extension of a unit makes an angle with a reference direction, which deviates in particular by less than 25%, preferably less than 10% and especially preferably less than 5% from 180°. In particular, a fluid exit direction from the exit opening concurs at least substantially with the direction of the surface normal. That a plane and/or a surface of a unit is "oriented" in a particular manner is meant in particular a direction of a surface normal of the plane and/or the surface and/or the principal plane of extension of a unit, the surface normal being arranged in particular on an outer side of the unit. By a "principal plane of extension" of an object, especially of an opening and/or a unit, is meant in particular a plane which is parallel to a largest lateral surface of a smallest imaginary cuboid which can still entirely encircle the object, and which runs in particular through the midpoint of the cuboid.

Advantageously, the fluid dispersing unit is submerged, especially entirely, in the other fluid in the operating state. In particular, the stirrer device comprises a stirring shaft, which is advantageously formed as a hollow shaft. The stirring shaft advantageously extends parallel to the axis of rotation, and in particular the axis of rotation extends inside the stirring shaft. The fluid dispersing unit is arranged in particular in the operating state in rotationally fixed manner on the stirring shaft and is connected, especially fluidically, to it. In particular, the fluid dispersing unit is arranged on the stirring shaft by means of a force locking and/or form fitting connection, while the connection in particular may be a flanged, a welded, and/or a shrink-fitting connection. In particular, the stirring shaft has at least one inlet opening. Advantageously, the stirring shaft has a plurality of inlet openings. By an "inlet opening of the stirring shaft" is meant in particular an opening at which the fluid enters and/or is sucked into the stirring shaft. The stirring shaft can be placed in rotation in particular by a motor, advantageously by an electric motor of the stirrer device. In particular, the stirring shaft in the operating state is oriented parallel to an acting gravity force. Preferably, the disperser in the operating state is in a fluidic communication with the stirring shaft. In particular, the inlet opening and the exit opening are fluidically connected to each other. In particular, the optimization unit comprises at least one contour unit, which is adapted to favour in particular an entry of the fluid into at least the inlet opening. The contour unit is arranged in particular on the stirring shaft. The contour unit in particular has at least one contour element which is advantageously associated with one of the inlet openings. In particular, each inlet opening is associated with at least one contour element. Advantageously, the contour element is shaped as a baffle.

By an "optimization unit" is meant in particular a functioning structural and/or functional component of the stirrer device, which in the operating state influences and advantageously favours a dispersing process, especially one carried out at least substantially by the fluid dispersing unit, especially as compared to a corresponding stirrer device without an optimization unit, and/or increases the efficiency of the dispersing process and/or the fluid dispersing unit. Advantageously, the optimization unit comprises multiple components, which in the operating state can influence in particular the dispersing process in a different manner, especially independently of one another. The optimization unit in particular can in particular influence a flow behaviour of the fluid and/or the other fluid. In particular, the optimization unit in the operating state increases the differential pressure at the exit opening, especially a pressure difference between an inner pressure present in front of the exit opening and an outside pressure prevailing behind the exit opening, advantageously by means of geometrical structures and/or geometrical design elements, especially for a constant extension of the fluid dispersing unit, such as a constant diameter of the fluid dispersing unit and/or a constant extension of the exit opening.

By a "differential pressure" is meant in particular a pressure difference between an inner pressure and an outside pressure in the operating state, especially at fixed speed of rotation. In particular, the inner pressure prevails inside the fluid dispersing unit, especially directly in front of the exit opening. The inner pressure in particular is equal to a difference between a fluid pressure at the inlet opening of the stirring shaft and a pressure loss occurring in particular inside the stirring shaft and inside the fluid dispersing unit, especially due to friction and/or the formation of flow eddies. In particular, the outside pressure prevails outside the fluid dispersing unit directly behind the exit opening, especially in a dispersion zone. By a "dispersion zone" is meant in particular a region about the fluid dispersing unit in which at any point in time of the operating state at least the majority of the mixing of the fluid with the other fluid and/or the dispersion process of the fluid in the other fluid and/or a chemical reaction between the fluid or at least one component of the fluid and the other fluid or at least one other component of the other fluid takes place. By the phrase "at least the majority" is meant in particular at least 55%, advantageously at least 65%, preferably at least 75%, especially preferably at least 85% and especially advantageously at least 95%. By a "fluid" and "another fluid" is meant in particular a gas or a gas mixture and/or a liquid or a liquid mixture, and/or a gas/liquid mixture and/or a solid/liquid mixture or gas/solid/liquid mixture. In particular, the fluid and/or the other fluid may be present as a two-phase or a three-phase mixture or a two-phase or three-phase dispersion. In particular, the fluid and/or the other fluid may be present as an emulsion. In particular, by the fluid is meant the dispersed phase and by the other fluid is meant the dispersing agent. Advantageously, the fluid is gaseous. Advantageously, the other fluid is liquid, formed as a gas/liquid mixture or as a solid/liquid mixture or as a gas/solid/liquid mixture. Advantageously, the other fluid is formed as a suspension, which may have in particular at least one solid, which can be formed especially as a catalyst. In particular, the solid favours and/or intensifies at least partly an interaction, such as a chemical interaction and/or reaction, of at least one component of the first fluid and at least one other component of the other fluid. In particular, the fluid or at least one component of the fluid reacts at least partly in a chemical reaction with the other fluid or with at least one other component of the other fluid. In particular, the fluid and the other fluid may each comprise a multiple-liquid mixture, in which a solid, especially a catalyst, is dispersed and/or distributed. For example, the fluid may be a solid/liquid mixture and the other fluid a solid/liquid/liquid mixture, having two other liquids and one solid, wherein the two liquids form a two-phase mixture. By "provided" is meant specially designed and/or equipped. That an object is provided for a particular function is meant in particular that the object fulfils and/or performs this particular function in at least one application and/or operating state.

Furthermore, it is proposed that the optimization unit comprises at least one outside pressure optimization unit, which in the operating state and especially at fixed speed of rotation reduces at least one outside pressure acting contrary to the fluid discharge. In this way, in particular, an emergence of the fluid from the exit opening can be favoured and advantageously increased. In particular, a volume flow through the exit opening at constant ambient conditions is proportional to the differential pressure, which depends in particular on the outside pressure. In particular, the outside pressure optimization unit at fixed speed of rotation of the stirrer device reduces the outside pressure especially by geometrical structures and/or geometrical design elements. In particular, the outside pressure optimization unit influences an exterior fluid flow, which flows in particular around the fluid dispersing unit inside the dispersing zone and especially around the disperser.

In particular, the disperser has an outer wall, which is oriented at least substantially in the direction of rotation. By a unit being "oriented at least substantially in the direction of rotation" is meant here in particular that the surface normal of the principal plane of extension of the unit makes an angle with the direction of rotation, especially with a tangent to the direction of rotation, especially an angle less than 90°, advantageously less than 45°, preferably less than 20° and especially advantageously less than 10°.

Furthermore, it is proposed that the fluid dispersing unit has an additional exit opening for at least one additional fluid discharge, which is situated before the exit opening viewed in the direction of rotation of the fluid dispersing unit, and the optimization unit, advantageously the outside pressure optimization unit, in the operating state, especially at fixed speed of rotation, reduces at least an influencing of the fluid discharge by the additional fluid discharge. In particular, the fluid dispersing unit comprises at least one additional disperser, which has in particular the additional exit opening. Advantageously, the disperser and the additional disperser are identical in configuration and can be made congruent in particular by a rotation of the fluid dispersing unit about the axis of rotation. Advantageously, the exit opening and the additional exit opening are identical in configuration and can be made congruent in particular by a rotation of the fluid dispersing unit about the axis of rotation. In particular, the exit opening and the additional exit opening form a dispersion cell. In particular, two consecutive exit openings form the dispersion cell. The number of dispersion cells is equal to the number of exit openings. In particular, the fluid dispersing unit can have more than two exit openings. The exit openings advantageously have a mutual angular spacing amounting to the same angle between the closest exit openings situated on the circumference. The angular spacing in particular amounts to 360°/n, where n is the number of exit openings of the fluid dispersing unit. In this way, in particular, a distribution of the fluid in the other fluid can be increased advantageously. In particular, in this way time can be saved when producing a mixture and/or a dispersion and/or a chemical reaction. In particular, the further exit opening may be offset in height from the exit opening in regard to the axis of rotation. Alternatively or additionally, the exit opening and the additional exit opening may be oriented at least partly opposite in relation to the plane of rotation. Advantageously, the exit opening can be oriented at least for the most part above the plane of rotation and the additional exit opening at least for the most part below the plane of rotation, or vice versa. In this way, the dispersing zone can be increased, in particular. Advantageously, the exterior fluid flow generated by the outside pressure optimization unit in the operating state at least flushes away an eddy formation, which forms especially at least partly due to an emergence of the fluid from the exit opening and propagates in particular as far as the outer wall of the disperser with the additional exit opening and negatively influences and in particular increases the outside pressure, whereby the eddy formation causes in particular a reduced mean density at the outer wall.

In particular, the fluid dispersing unit and the optimization unit and especially the outside pressure optimization unit can be designed different from each other. In this way, in particular, a simple assembly and/or manufacture can be made possible. In addition, in this way flexibility can be achieved with regard to different mixing and/or dispersion conditions by a simple replacement of the fluid dispersing unit and/or the optimization unit, especially the outside pressure optimization unit. In particular, the outside pressure optimization unit is arranged at least partly on the stirring shaft, especially beneath, advantageously directly beneath the fluid dispersing unit, especially fixed in rotation. The terms "above" and "beneath" pertain here in particular to a positioning of the stirrer device in at least one operating state.

Moreover, it would also be conceivable for the fluid dispersing unit and the optimization unit, especially the outside pressure optimization unit, to be designed at least partly as a single piece, which advantageously minimizes production costs and makes possible in particular a stable construction. By two units being designed "partly as a single piece" is meant in particular that the units have at least one, especially at least two, advantageously at least three common elements, which are part, especially a functionally important part, of both units. In particular, by the term "single piece" can be meant here the fact that they are at least connected by integral bonding, such as a welding process, a gluing process, a moulded-on process, and/or another process making sense to the skilled person, and/or they are advantageously formed as a single piece, for example by being made from a casting, advantageously from a single blank and/or by being made in a single or multiple-component injection moulding process, advantageously in a 3D printing process.

Furthermore, it is proposed that the optimization unit and especially the outside pressure optimization unit in the operating state generates at least one exterior fluid flow which is oriented at least substantially parallel to the axis of rotation of the fluid dispersing unit in at least one flow section. The optimization unit, especially the outside pressure optimization unit, advantageously generates the exterior fluid flow reducing the outside pressure, and in particular an increasing of a local mean density occurs for the other fluid near the outer wall. In particular, the exterior fluid flow is produced at least partly beneath the fluid dispersing unit. In particular, the optimization unit, especially the outside pressure optimization unit, delivers the other fluid from a region distant from the dispersion to the dispersion zone. In this way, the other fluid, especially a catalyst, can advantageously be delivered from the dispersion-distant region to the dispersion zone, whereby in particular a mixing and/or dispersing and/or a chemical reaction and/or a rate of a chemical reaction can be optimized. Advantageously, the exterior fluid flow is oriented at least for a major portion from bottom to top, especially against the force of gravity. In this way, in particular, an emergence of the fluid from the fluid discharge can be favoured and advantageously increased. In the dispersion-distant region there occurs in particular a mixing of the fluid with the other fluid by less than 50% of a total mixing at any given time of the operating state and/or a dispersion process of the fluid in the other fluid by less than 50% of the total dispersion and/or a chemical reaction between the fluid or at least one component of the fluid and the other fluid or at least one other component of the other fluid at any given time of the operating state. In particular, an at least partial demixing of the fluid and the other fluid occurs in the dispersion-distant region.

An especially complete and effective mixing and/or dispersing and/or an optimized chemical reaction and/or increased reaction speed of a chemical reaction can be achieved when the optimization unit and especially the outside pressure optimization unit comprises at least one blade able to turn about the axis of rotation of the fluid dispersing unit for the at least partial generating of the exterior fluid flow. In particular, the principal plane of extension of the blade is tilted with respect to the vertical. Advantageously, the blade has a curved shape. In particular, the blade brings about a circulation of the other fluid. Advantageously, the optimization unit and in particular the outside pressure optimization unit comprises at least one additional blade. In particular, the total number of blades and additional blades is equal to the number of exit openings.

Preferably, the individual blades have a uniform blade angle spacing from each other. In particular, the blade angle spacing is equal to the angle spacing. Alternatively, the total number of blades may be different from the number of exit openings, for example by a factor of two. In particular, the total number of blades may exceed the number of exit openings, especially by a factor of two, and in particular the angle spacing takes on a larger value, especially twice as large a value as the blade angle spacing. In particular, the blade and the additional blade are identical in configuration. Advantageously, all blades are identical in configuration. Advantageously, the optimization unit and especially the outside pressure optimization unit are configured as a turbine.

Furthermore, it is proposed that the blade is associated to the exit opening. In this way, in particular, a formation of eddies at the outer wall, advantageously at each outer wall, can be efficiently prevented. Advantageously, precisely one blade is associated to precisely one exit opening. Alternatively, multiple blades, especially two blades, can be coordinated precisely with one exit opening. In particular, the blade and/or the multiple blades can be arranged relative to the exit opening in such a way that the exterior fluid flow generated at least partly by the blade and/or the multiple blades advantageously flows directly past the outer wall. In particular, the blade and/or the multiple blades and the exit opening associated to the blade and/or the multiple blades rotate with the same angular velocity in the operating state. In this way, a uniform and/or constant exterior fluid flow can be generated.

Furthermore, it is proposed that the blade is situated with an offset from the exit opening, viewed along the axis of rotation, in particular it is offset downward. Advantageously, the blade is situated directly below the fluid dispersing unit. In particular, the blade may be offset in angle from the exit opening. In this way, in particular, an advantageous flow against the outer wall of the disperser can be achieved, especially in order to prevent the formation of eddies. Furthermore, an optimized circulation of the other fluid, especially the catalyst, can be advantageously achieved, making possible an optimizing of the mixing and/or dispersion process and/or the chemical reaction and/or the rate of the chemical reaction between the fluid or at least one component of the fluid and the other fluid or at least one other component of the other fluid.

Furthermore, it is proposed that the optimization unit and especially the outside pressure optimization unit comprises at least one flow guiding element for deflecting, in particular completely, the exterior fluid flow in a direction at least substantially perpendicular to the axis of rotation of the fluid dispersing unit. In this way, in particular, the formation of eddies at the outer wall of the disperser can be prevented at least substantially entirely. The flow guiding element is advantageously situated above the disperser. The flow guiding element in particular is fashioned as a concentric, closed disk, with the axis of rotation running through its midpoint. In particular, the exterior fluid flow after a deflection flows at least partly through the flow element, advantageously at least substantially radially outward along the outer wall of the disperser. The flow guiding element is designed as a passive component. Alternatively, the flow guiding element may be designed as an active component, and in particular can influence the exterior fluid flow, especially depending on a speed of rotation of the fluid dispersing unit.

Furthermore, it is proposed that the optimization unit comprises at least one inner pressure optimization unit, which in the operating state increases at least an inner pressure favouring the fluid discharge. In this way, in particular, a volume flow of fluid through the exit opening can be increased. In particular, the inner pressure optimization unit is situated at least partly and advantageously entirely inside the stirring shaft and/or the fluid dispersing unit. Advantageously, the inner pressure optimization unit is fashioned as a shaping and/or as a geometrical design element. In particular, the inner pressure optimization unit is formed as a single piece with the fluid dispersing unit. Advantageously, the inner pressure optimization unit decreases a pressure loss, which arises in particular inside the stirring shaft and/or the fluid dispersing unit and decreases the inner pressure.

Furthermore, it is proposed that the optimization unit, especially the inner pressure optimization unit, comprises at least one fluid delivery unit, which may be formed in particular at least partly as a single piece with the inner pressure optimization unit, and which in the operating state generates an optimized interior fluid flow, especially one at least mostly free of eddies. In this way, in particular, a uniform interior fluid flow can be created. Furthermore, in particular, in this way a decreasing of the differential pressure due to a nonuniform interior fluid flow can be lessened. The fluid delivery unit is advantageously fixed in rotation to the fluid dispersing unit. In particular, in the operating state the interior fluid flow moves from the stirring shaft towards the fluid duct of the disperser and then through the exit opening and out of the fluid dispersing unit into the dispersing zone. Advantageously, the fluid delivery unit is fashioned as a turbine. In particular, the fluid delivery unit is situated at the centre of the fluid dispersing unit.

In order to make possible an optimized delivery of the fluid towards the dispersing zone, it is proposed that the fluid delivery unit delivers the fluid in the operating state from at least one area of the fluid dispersing unit that is near the axis of rotation at least partly radially outward towards the exit opening. In particular, the fluid delivery unit transforms an interior fluid flow directed parallel to the axis of rotation into an interior fluid flow directed advantageously at least substantially radially in the direction of the fluid duct.

Furthermore, it is proposed that the fluid delivery unit comprises at least one vane having a curved shape and which delivers the fluid in the area near the axis of rotation at least substantially parallel to the axis of rotation of the fluid dispersing unit. In this way, in particular, an advantageous delivery of the fluid from the stirring shaft to the fluid dispersing unit can be made possible. Advantageously, the fluid dispersing unit has two vanes, especially advantageously multiple vanes. Preferably, the number of vanes is equal to the number of exit openings. In order to make possible an optimal delivery of the fluid, the vane is coordinated in particular with the fluid duct.

Furthermore, it is proposed that the inner pressure optimization unit and/or the fluid delivery unit is arranged entirely inside the fluid dispersing unit. This makes possible a compact design. In particular, the fluid dispersing unit comprises a receiving space, in which the fluid delivery unit is situated. The receiving space in particular has a cylindrical shape on its sides. In particular, a bottom of the receiving space has a centrally located, pointlike tapering elevation. Advantageously, the fluid delivery unit is formed at the wall. In particular, the stirring shaft is fluidically connected to the receiving space. In particular, the receiving space and/or a transitional region of the receiving space is formed smooth and/or free of edges toward the fluid duct. In this way, it is possible to avoid adhesions and/or caked deposits, especially of solid particles, inside the receiving space. Furthermore, in this way a formation of eddies inside the receiving space can in particular be at least partly prevented. Moreover, in particular, this makes possible a cleaning-in-place design of the receiving space, so that maintenance costs can be minimized, in particular.

Furthermore, it is proposed that surfaces of the fluid delivery unit making contact with the fluid are formed at least substantially smooth and/or free of edges. In this way, it is possible to avoid adhesions and/or caked deposits, especially of solid particles, on the fluid delivery unit. Furthermore, this can at least partly reduce the formation of eddies at the blade of the fluid delivery unit. Moreover, in particular, this makes possible a cleaning-in-place design of the fluid delivery unit, so that maintenance costs can be minimized, in particular.

Furthermore, it is proposed that the fluid dispersing unit comprises at least one turbulence unit for influencing the fluid discharge and/or the additional fluid discharge. In this way, in particular, an advantageous distribution of the fluid after emerging from the exit opening and/or from the additional exit opening and an especially increased mass transfer of the fluid to the other fluid can take place. In particular, the turbulence unit is fashioned at least partly and/or for a portion, preferably entirely, as a spiral and/or as a spring. In addition, the turbulence unit may comprise in particular at least one especially curved rod, which is situated advantageously in an outer region of the stirrer device, viewed along the axis of rotation of the fluid dispersing unit, especially in the circumferential direction of the fluid dispersing unit, and especially between the dispersers. In particular, the turbulence unit comprises at least one spiral and/or one spiral spring, especially a tension spring, which is arranged advantageously on the rod in at least one operating state and in particular is wound around it, so that it encircles it at least partially. In particular, the spiral and/or the spiral spring, especially the tension spring, has a pretensioning in at least one operating state. Alternatively or additionally, the turbulence unit may be formed at least partly and/or for a section as a lattice. In particular, the turbulence unit is situated in an outer region of the stirrer device, viewed along the axis of rotation of the fluid dispersing unit. In particular, a principal plane of extension of the turbulence unit is parallel to, advantageously congruent with, a principal plane of extension of the fluid dispersing unit. In particular, the turbulence unit is arranged between the dispersers. The turbulence unit is adapted to favour a passing of the fluid into the other fluid by creating turbulences and/or shear forces in a region near the turbulence unit. Especially in the case when the fluid is present as a gaseous phase, the turbulence unit advantageously reduces the diameter of primary gas bubbles emerging from the exit opening and/or from the additional exit opening. The turbulence unit in particular breaks up the primary gas bubbles emerging from the exit opening and/or from the additional exit opening especially by virtue of shear forces into many smaller gas bubbles. By the "near region" of a unit is meant in particular a spatial region surrounding the unit and in particular enclosing it entirely, wherein the region has points in space which in particular are not part of the unit and which lie in particular within imaginary spheres, each time comprising a point of the unit as their midpoint, with a spherical radius being in particular at least equal to an extension of the unit transversely to a principal plane of extension of the unit, advantageously being at least twice, especially advantageously at least three times as large as the extension of the unit transversely to the principal plane of extension of the unit.

Furthermore, it is proposed that the fluid dispersing unit comprises at least one round pipe arranged substantially perpendicular to the axis of rotation on which the exit opening is arranged. The fluid dispersing unit may comprise multiple round pipes, especially at least two, advantageously at least three, especially advantageously at least four, preferably at least five and especially preferably at least six, arranged substantially perpendicular to the axis of rotation, on each of which there is arranged at least one exit opening. In this way, a stirrer device with improved dispersing properties can advantageously be provided. In particular, a dispersing performance can advantageously be enhanced. By a "round pipe" is meant in particular an element of the fluid dispersing unit which, when viewed perpendicular to its principal plane of extension, has a circular and/or oval cross section. Advantageously, the exit opening is situated in a region at maximum distance from the axis of rotation of the fluid dispersing unit and it has in particular a circular and/or oval cross section. The longest outer edge of the round pipe may have a straight trend, starting from the exit opening, in the direction of the axis of rotation. Preferably, the trend of the longest outer edge of the round pipe is curved, however, starting from the exit opening, in the direction of the axis of rotation and contrary to the direction of rotation of the fluid dispersing unit.

Furthermore, it is proposed that the fluid dispersing unit viewed in at least one direction perpendicular to the axis of rotation has the shape of an airfoil profile at least for a portion. In this way, advantageous flow properties can be achieved for the other fluid, especially the dispersing agent, in an operating state of the stirrer device. By the fluid dispersing unit having "the shape of an airfoil profile at least for a portion viewed in at least one direction perpendicular to the axis of rotation" is meant in particular that the fluid dispersing unit has at least one region whose cross section has the shape of an airfoil profile viewed in at least one direction perpendicular to the axis of rotation of the fluid dispersing unit, the principal plane of extension of the exit opening lying in particular inside this cross section. By "the shape of an airfoil profile" is meant in particular a geometrical shape of a region of the fluid dispersing unit having at least a longest outer edge, whose trend viewed in a cross section perpendicular to a principal plane of extension of the fluid dispersing unit has at least one curvature and/or vaulting, especially a nonsymmetrical one, with respect to the plane of rotation of the fluid dispersing unit. The fluid dispersing unit may have multiple regions, each of them having an airfoil profile shape in at least one viewing direction perpendicular to the axis of rotation. Preferably, each dispersion cell of the fluid dispersing unit has the shape of an airfoil profile in at least one viewing direction perpendicular to the axis of rotation. The fluid dispersing unit may be fashioned as a single piece, for example by being manufactured in a single or multiple-component injection moulding process, advantageously in a 3D printing process. In this way, an airfoil profile configuration of the fluid dispersing unit can be realized with especially simple technical means and/or especially cost effectively.

The stirrer device according to the invention is not limited to the above described application and configuration. In particular, the stirrer device according to the invention may have a number of individual elements, components and units different from the number mentioned herein to fulfil a functionality as described herein.

DRAWINGS

Further benefits will emerge from the following description of the figures. The figures represent exemplary embodiments of the invention. The drawings, the description, and the claims contain numerous features in combination. The skilled person will advisedly also view the features individually and combine them to form further meaningful combinations.

Figure 2:
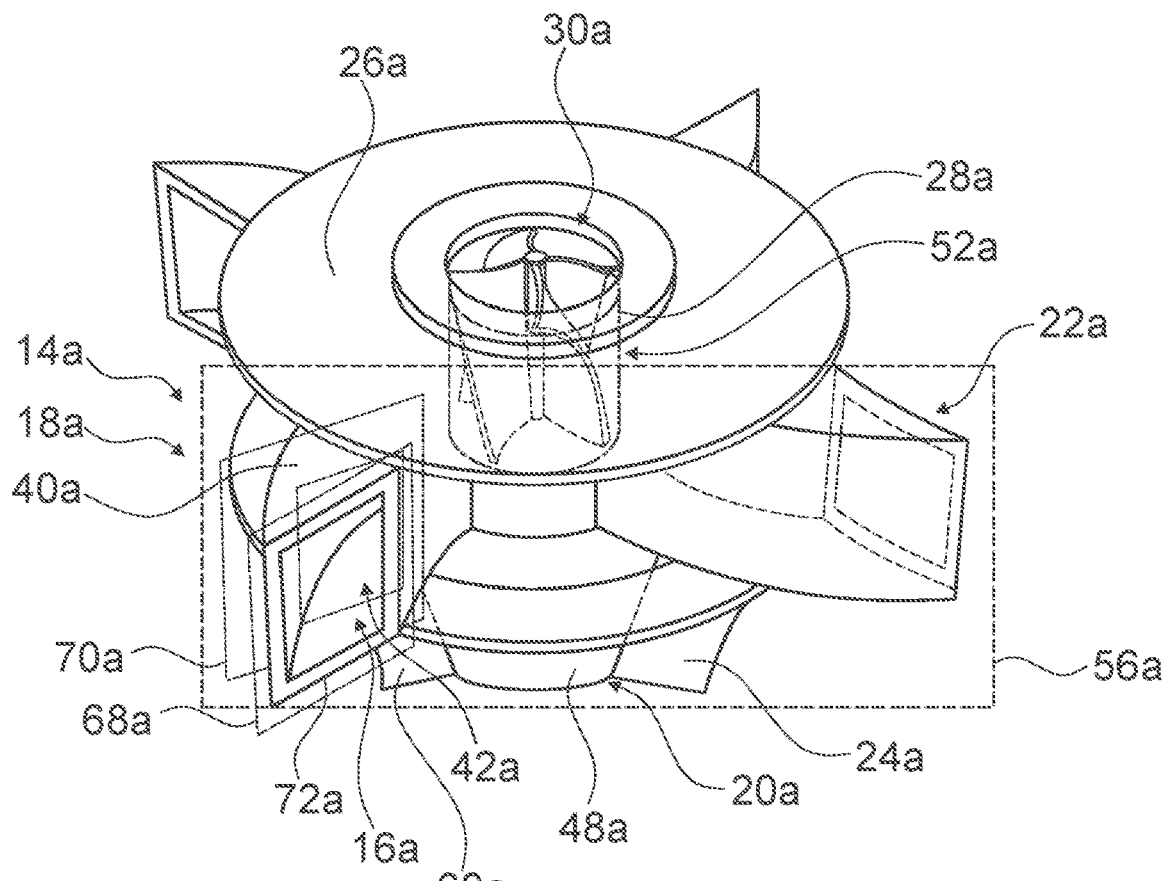
Figure 3:
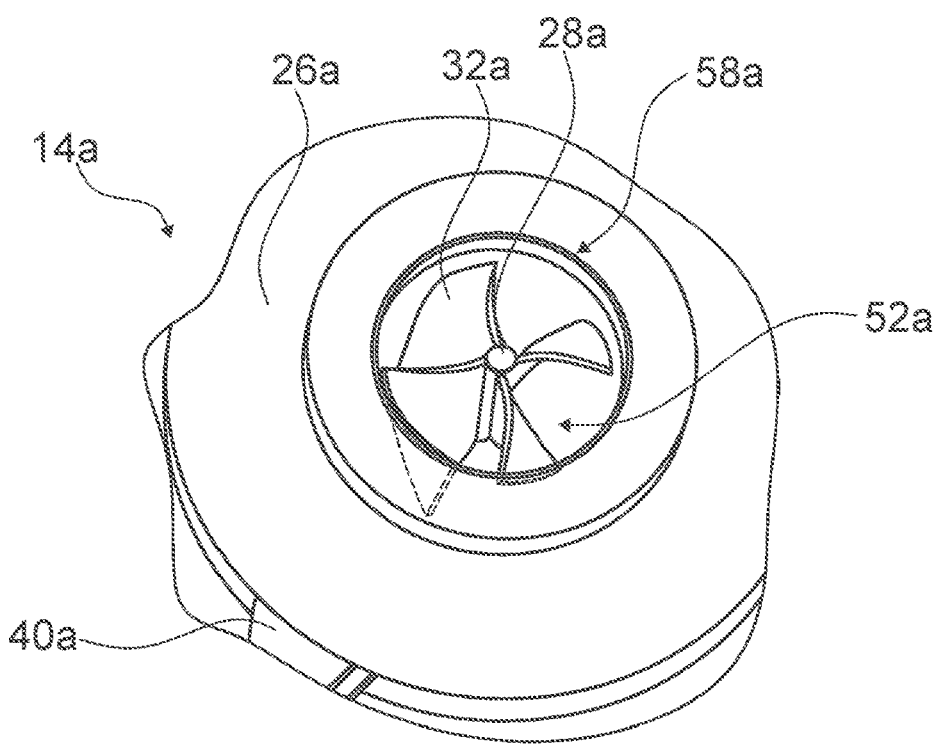
Figure 4:
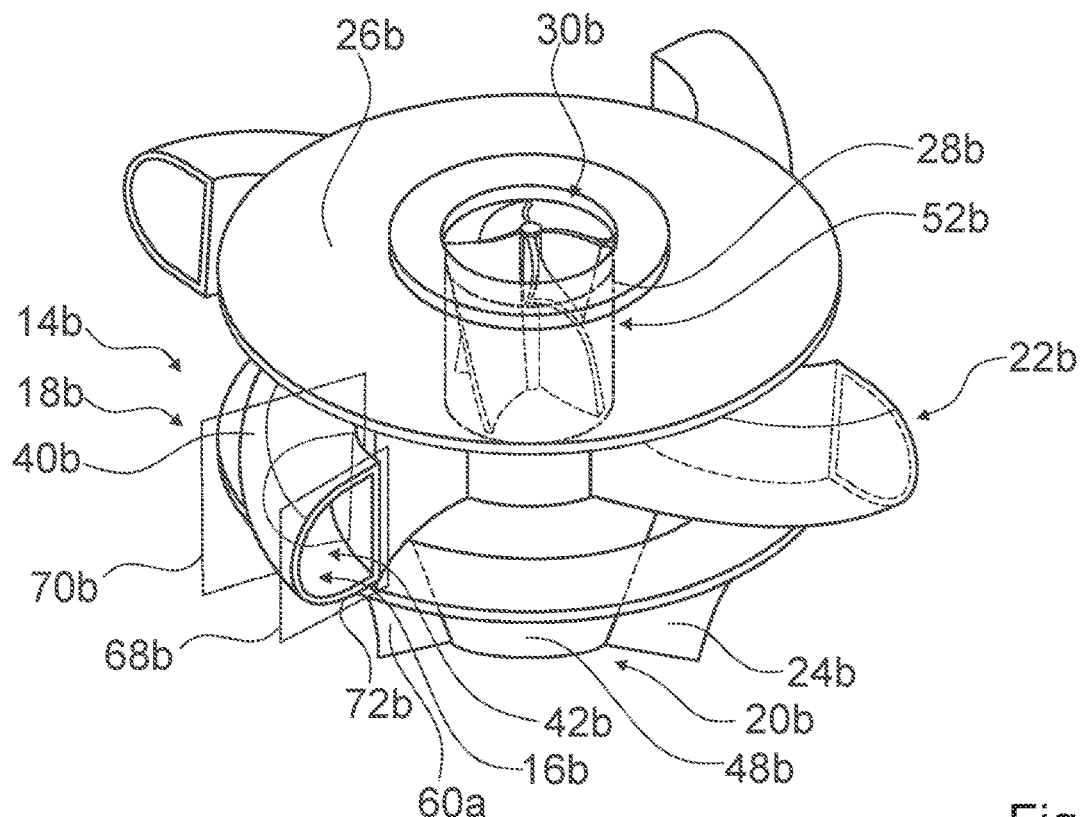
Figure 5:
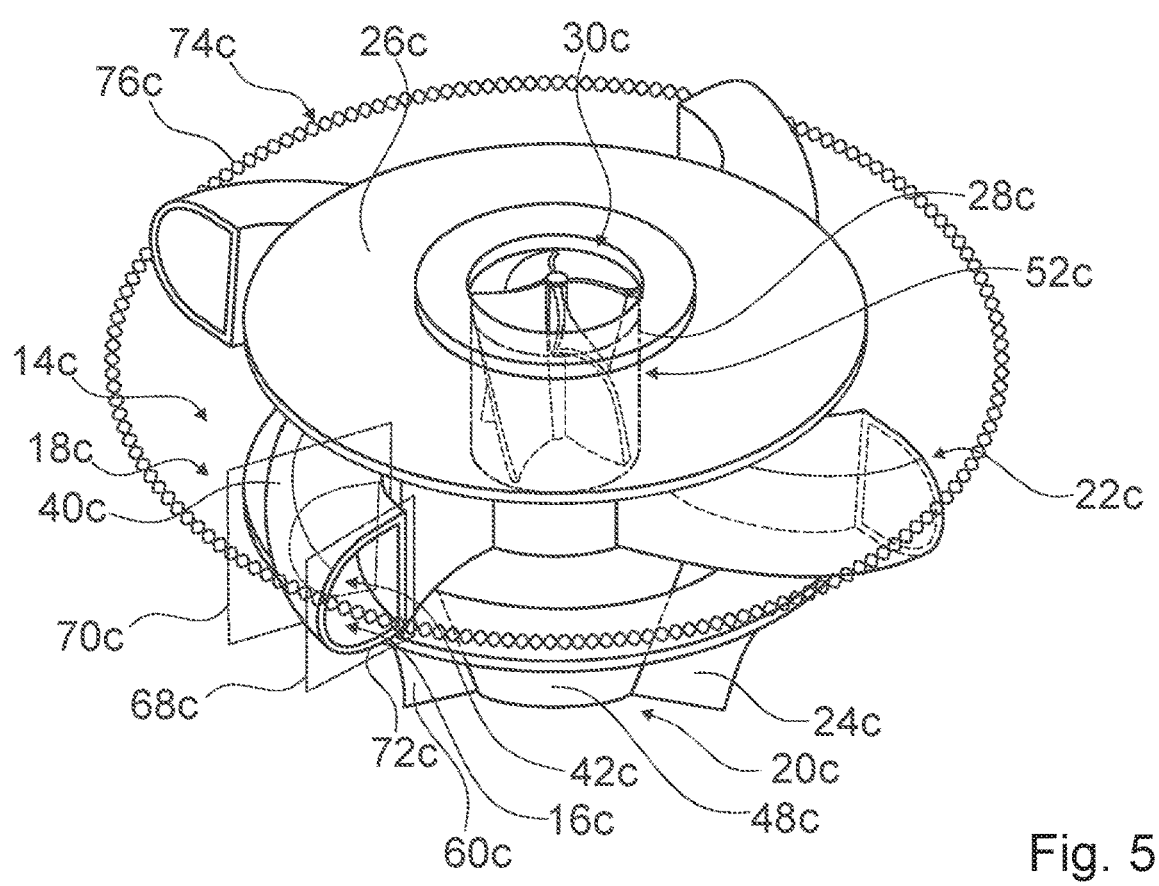
Figure 6:
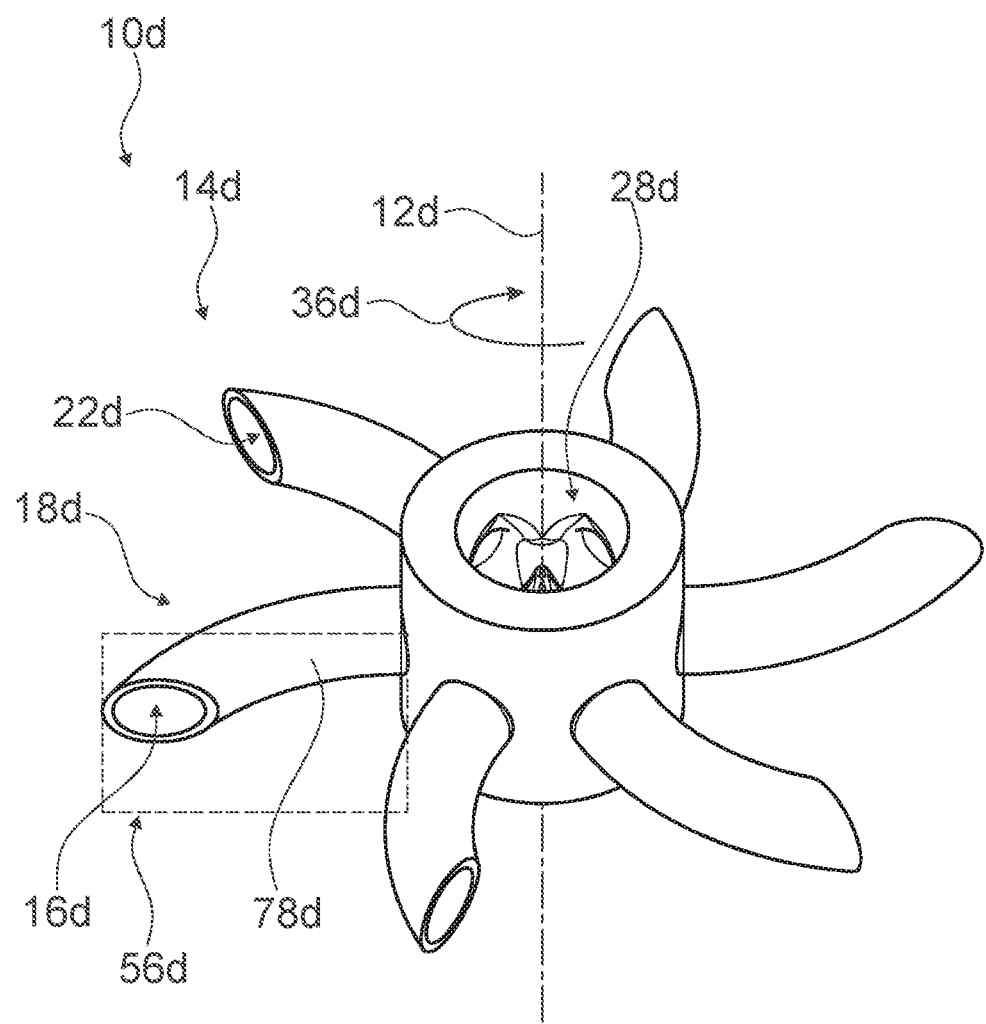
Figure 7:
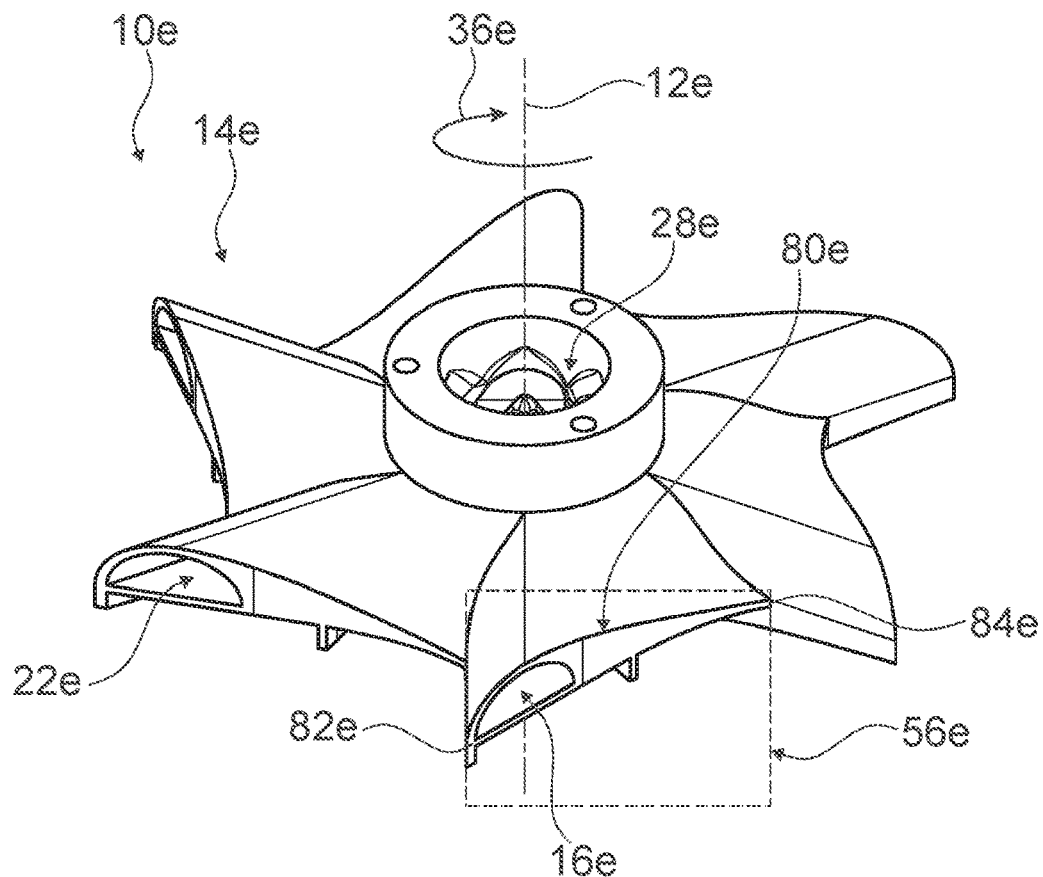
Figure 8:
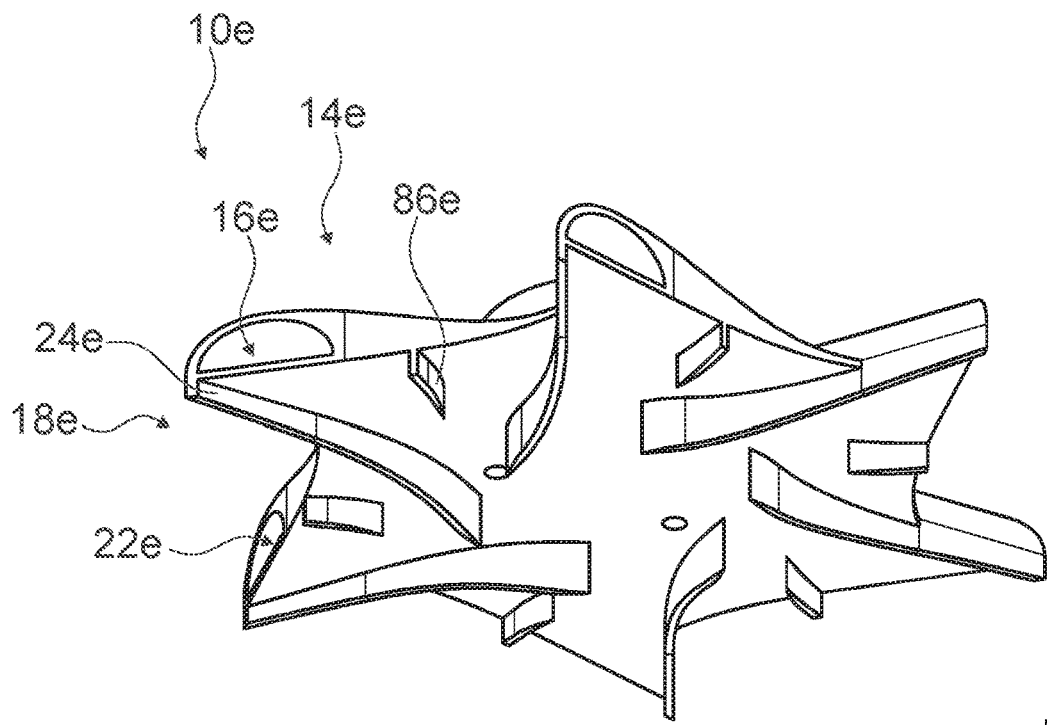

There are shown:

FIG. 1 part of a stirrer with a stirrer device in a perspective side view,

FIG. 2 a perspective schematic representation of a fluid dispersing unit of the stirrer device and an optimization unit of the stirrer device with a fluid delivery unit, FIG. 3 an enlarged schematic representation of the fluid delivery unit arranged in a receiving space of the fluid dispersing unit, FIG. 4 a perspective schematic representation of a fluid dispersing unit of an alternative stirrer device and an optimization unit of the alternative stirrer device with a fluid delivery unit, FIG. 5 a perspective schematic representation of a fluid dispersing unit of a further alternative stirrer device and an optimization unit of the further alternative stirrer device with a fluid delivery unit, FIG. 6 a further exemplary embodiment of a fluid dispersing unit of a stirrer device in a perspective schematic representation, FIG. 7 a further exemplary embodiment of a fluid dispersing unit of a stirrer device in a perspective schematic representation, and FIG. 8 a further perspective schematic representation of the fluid dispersing unit of the exemplary embodiment of FIG. 7.

DESCRIPTION OF EXEMPLARY EMBODIMENTS

In the following described exemplary embodiments, different structural units and/or components are present more than one time. Similarly designed structural units and/or components which are given the same reference numbers in the drawings are described only once, in order to simplify the following description of the figures.

FIG. 1 shows part of a stirrer 34a. The stirrer 34a comprises a stirrer device 10a. The stirrer device 10a is adapted for the mixing of a fluid with another fluid. The stirrer device 10a is adapted for the dispersing of the fluid with the other fluid. The fluid is present as a gaseous phase. The other fluid is present in an initial state as a liquid phase. In the operating state, the other fluid is present as a gas/liquid mixed phase.

The stirrer device 10a comprises a stirring shaft 38a. The stirring shaft 38a rotates in at least one operating state about an axis of rotation 12a of the stirrer device 10a. The stirring shaft 38a transmits a torque and places elements arranged on the stirring shaft 38a in a rotary movement. The stirring shaft 38a can be placed in rotation by an electric motor 46a of the stirrer 34a.

The stirring shaft 38a is configured as a hollow shaft. The axis of rotation 12a runs inside the stirring shaft 38a. The stirring shaft 38a is oriented parallel to the vertical. The stirring shaft 38a has multiple inlet openings 44a. The inlet openings 44a are adapted to suck in the fluid in the operating state.

The stirrer device 10a comprises a fluid dispersing unit 14a. The stirring shaft 38a is fluidically connected to the fluid dispersing unit 14a. The fluid dispersing unit 14a is fixed in rotation on the stirring shaft 38a. The fluid dispersing unit 14a is arranged on the stirring shaft 38a by means of a force locking and/or form fitting connection. The connection is a screw connection. The fluid dispersing unit 14a can turn about the axis of rotation 12a. The stirring shaft 38a and the fluid dispersing unit 14a have the same angular velocity in the operating state. In the operating state, the fluid dispersing unit 14a is entirely submerged in the other fluid.

The fluid dispersing unit 14a comprises an exit opening 16a. The exit opening 16a has a rectangular shape when viewed in a direction perpendicular to a principal plane of extension 68a of the exit opening 16a. Alternatively, the exit opening 16a could have an oval or round shape when viewed in a direction perpendicular to the principal plane of extension 68a of the exit opening 16a.

The fluid dispersing unit 14a comprises an additional exit opening 22a. The additional exit opening 22a is arranged in front of the exit opening 16a, viewed in the direction of rotation 36a of the fluid dispersing unit 14a.

The fluid dispersing unit 14a comprises four exit openings 16a, 22a. The exit openings 16a, 22a are provided respectively for a fluid discharge. The fluid dispersing unit 14a comprises four dispersers 40a. Each of the four dispersers 40a respectively defines one of the exit openings 16a, 22a. The dispersers 40a are each designed as a stirring blade.

In the operating state, the exit openings 16a, 22a are oriented in a direction opposite the direction of rotation 36a for a turning of the fluid dispersing unit 14a in the direction of rotation 36a.

The exit openings 16a, 22a have the same angle spacing from each other in the circumferential direction of the fluid dispersing unit 14a.

In the following, only one of the four dispersers 40a and only one of the four exit openings 16a, 22a shall be described, the description being applicable to all the dispersers 40a and all the exit openings 16a.

The disperser 40a is curved in a plane of rotation of the fluid dispersing unit 14a. The disperser 40a extends radially outward from a region of the fluid dispersing unit 14a near the centre. The disperser 40a is hollow in configuration. The disperser 40a stands in fluidic communication with the stirring shaft 38a. The disperser 40a defines a fluid duct 42a with the exit opening 16a.

In a section plane 70a, an outer boundary 72a of the disperser 40a has a rectangular shape at least substantially transversely to a direction of an interior fluid flow 54a through the fluid duct 42a. Alternatively, the outer boundary 72a of the disperser 40a could have an oval or round shape in a section plane 70a at least substantially transversely to a direction of the interior fluid flow 54a through the fluid duct 42a.

The shape of the exit opening 16a when viewed in a direction perpendicular to the principal plane of extension 68a of the exit opening 16a and the shape of the outer boundary 72a of the disperser 40a in the section plane 70a at least substantially transversely to a direction of the interior fluid flow 54a through the fluid duct 42a are substantially the same. It is conceivable that the shape of the exit opening 16a when viewed in a direction perpendicular to the principal plane of extension 68a of the exit opening 16a and the shape of the outer boundary 72a of the disperser 40a in the section plane 70a at least substantially transversely to a direction of the interior fluid flow 54a through the fluid duct 42a are different.

The section plane 70a and the principal plane of extension 68a of the exit opening 16a are at least substantially congruent at the exit opening 16a. The stirrer device 10a comprises an optimization unit 18a. The fluid dispersing unit 14a and the optimization unit 18a are formed in part as a single piece. The optimization unit 18a increases a differential pressure at the exit opening 16a, 22a in the operating state.

The optimization unit 18a comprises a contour unit 66a. The contour unit 66a is arranged on the stirring shaft 38a. The contour unit 66a is adapted to favour an entry of the fluid in the inlet openings 44a. The contour unit 66a comprises a contour element 62a. The contour unit 66a comprises multiple contour elements 62a.

The contour element 62a is designed as a baffle 64a. The contour element 62a has a curved configuration. The contour element 62a is arranged directly at the inlet opening 44a. Each contour element 62a is associated to precisely one inlet opening 44a. The contour element 62a guides the fluid towards the inlet opening 44a that is associated to the contour element 62a. The contour elements 62a are respectively associated to each inlet opening 44a.

The optimization unit 18a comprises an outside pressure optimization unit 20a. The outside pressure optimization unit 20a in the operating state decreases an outside pressure behind the exit opening 16a, 22a.

The fluid dispersing unit 14a and the outside pressure optimization unit 20a are partly formed as a single piece with each other.

The outside pressure optimization unit 20a comprises an impeller 48a. The impeller 48a comprises a blade 24a. The impeller 48a comprises a further blade 60a. The impeller 48a comprises four blades 24a, 60a. The blades 24a, 60a can turn about the axis of rotation 12a. The blades 24a, 60a have the same angle spacing from each other in the circumferential direction of the impeller 48a. The blades 24a, 60a are adapted to generating an exterior fluid flow 50a. The number of blades 24a, 60a corresponds to the number of exit openings 16a, 22a.

The impeller 48a is arranged beneath the fluid dispersing unit 14a. The blades 24a, 60a are arranged with a downward offset from the exit openings 16a, 22a, viewed along the axis of rotation 12a. Each blade 24a, 60a is associated to precisely one of the exit openings 16a, 22a.

The outside pressure optimization unit 20a generates an exterior fluid flow 50a by means of the blades 24a, 60a in the operating state. The exterior fluid flow 50a in a flow section is oriented parallel to the axis of rotation 12a (see FIG. 1).

The outside pressure optimization unit 20a comprises a flow guiding element 26a. The flow guiding element 26a is arranged above the exit openings 16a, 22a. The flow guiding element 26a is fashioned as a closed disk. The flow guiding element 26a is formed as a single piece with the fluid dispersing unit 14a. The flow guiding element 26a is adapted to deflect the exterior fluid flow 50a in a direction perpendicular to the axis of rotation 12a of the fluid dispersing unit 14a.

The outside pressure optimization unit 20a in the operating state reduces the outside pressure hindering the fluid discharge. The outside pressure optimization unit 20a in the operating state reduces an influencing of the fluid discharge from the exit opening 16a by the other fluid discharge from the other exit opening 22a, which lies in front of the exit opening 16a viewed in the direction of rotation 36a.

The exit opening 16a and the other exit opening 22a together form a dispersion cell 56a. Each exit opening 16a forms its own dispersion cell 56a with an exit opening 16a following directly after it.

The following description will hold for all fluid discharges at all four exit openings 16a, only describing here the fluid discharge at one of the four exit openings 16a. Due to the fluid discharge at the exit opening 16a on the disperser 40a, eddies are formed in the dispersion cell 56a at the disperser 40a directly following the disperser 40a in the direction of rotation 36a of the fluid dispersing unit 14a. The other fluid delivered by the blade 24a washes away the eddies. In this way, the other fluid inside the dispersion cell 56a increases the mean density at the disperser 40a with the other exit opening 22a.

The fluid dispersing unit 14a has a four cell symmetry. The dispersion cells 56a are arranged symmetrically around a circumference of the fluid dispersing unit 14a. Each dispersion cell 56a can be made congruent with the directly following dispersion cell 56a by a 90° turning in the direction of rotation 36a. Each dispersion cell 56a can be made congruent with itself by a 360° turning about the axis of rotation 12a. The fluid dispersing unit 14a may have any desired n-cell symmetry, n being the number of the exit openings 16a, 22a.

The fluid dispersing unit 14a comprises a receiving space 52a (see FIG. 3). The receiving space 52a is shaped as a cylinder. The optimization unit 18a comprises an inner pressure optimization unit 58a. The inner pressure optimization unit 58a in the operating state increases an inner pressure. The inner pressure optimization unit 58a is arranged entirely inside the fluid dispersing unit 14a.

The inner pressure optimization unit 58a comprises a fluid delivery unit 28a. The fluid delivery unit 28a is designed as a turbine. The fluid delivery unit 28a is arranged entirely inside the fluid dispersing unit 14a. The fluid delivery unit 28a is arranged entirely inside the receiving space 52a (see FIG. 1 to FIG. 3).

The fluid delivery unit 28a comprises multiple vanes 32a. The number of exit openings 16a, 22a corresponds to the number of vanes 32a. The fluid delivery unit 28a comprises four vanes 32a. The vanes 32a each have a curved configuration. The vanes 32a have the same angle spacing from each other in the circumferential direction of the fluid delivery unit 28a.

The receiving space 52a and/or a transitional region of the receiving space 52a is fashioned smooth and/or free of edges toward the fluid duct 42a. Surfaces of the fluid delivery unit 28a coming into contact with the fluid are formed smooth and/or free of edges.

In the operating state, the electric motor 46a places the stirring shaft 38a in rotation about the axis of rotation 12a. The fluid dispersing unit 14a, rotationally fixed to the stirring shaft 38a, rotates in the operating state about the axis of rotation 12a.

In the operating state, a negative pressure is created at the exit openings 16a, 22a. In the operating state, the fluid flows through the inlet openings 44a into the stirring shaft 38a. The stirring shaft 38a is fluidically connected to the receiving space 52a. The interior fluid flow 54a is produced by a differential pressure between the inlet openings 44a and the exit openings 16a, 22a. The interior fluid flow 54a extends from the inlet openings 44a at first through the stirring shaft 38a and then through the fluid dispersing unit 14a to the exit openings 16a, 22a.

In the operating state the fluid arrives at the receiving space 52a. The vanes 32a of the fluid delivery unit 28a deliver the fluid to the area near the axis of rotation 30a, parallel to the axis of rotation 12a. The fluid delivery unit 28a delivers the fluid radially outward from an area near the axis of rotation 30a of the fluid dispersing unit 14a towards the exit opening 16a.

The fluid delivery unit 28a generates the optimized interior fluid flow 54a in the operating state. The fluid delivery unit 28a generates the eddy-free interior fluid flow 54a in the operating state. The fluid delivery unit 28a reduces a pressure loss in the operating state.

It is conceivable for the stirrer device 10a to mix and/or disperse three different fluids with each other. The inlet openings 44a in this case are in a fluid with the lowest density, the outside pressure optimization unit 20a in a second fluid with the highest density, and the fluid dispersing unit 14a in a third fluid with a medium density whose value lies between the value for the lowest density and the value for the highest density. Furthermore, at least one solid phase, such as a catalyst, can be added to at least one of the three fluids.

FIG. 4 shows an alternative exemplary embodiment of a stirrer device 10b. In order to avoid needless repetition, the same reference numbers are therefore used for the same assemblies and reference is made to the remarks of FIGS. 1 to 3. In the following, only the details by which the exemplary embodiment of FIGS. 1 to 3 differs from the alternative exemplary embodiment of FIG. 4 shall be discussed. In order to distinguish the exemplary embodiments, the letter b has been added to the references of the alternative exemplary embodiment in FIG. 4.

FIG. 4 shows a perspective schematic representation of a fluid dispersing unit 14b of an alternative stirrer device 10b and an optimization unit 18b of the alternative stirrer device 10b with a fluid delivery unit 28b.

The fluid dispersing unit 14b comprises an exit opening 16b. The exit opening 16b has a semicircular shape, viewed in a direction perpendicular to a principal plane of extension 68b of the exit opening 16b. Alternatively, the exit opening 16b could have an oval or round shape viewed in a direction perpendicular to the principal plane of extension 68b of the exit opening 16b.

The fluid dispersing unit 14b comprises a further exit opening 22b. The further exit opening 22b is situated in front of the exit opening 16b, viewed in the direction of rotation 36b of the fluid dispersing unit 14b.

The fluid dispersing unit 14b comprises four exit openings 16b, 22b. The exit openings 16b, 22b are adapted respectively for a fluid discharge. The fluid dispersing unit 14b comprises four dispersers 40b. Each of the four dispersers 40b respectively defines one of the exit openings 16b, 22b. The dispersers 40b are each designed as a stirring blade.

In the operating state, the exit openings 16b, 22b are oriented in a direction opposite the direction of rotation 36b upon rotation of the fluid dispersing unit 14b in the direction of rotation 36b.

The exit openings 16b, 22b have the same angle spacing from each other in the circumferential direction of the fluid dispersing unit 14b.

In the following, only one of the four dispersers 40b and only one of the four exit openings 16b, 22b shall be described, the description being applicable to all the dispersers 40b and all the exit openings 16b.

The disperser 40b is curved in a plane of rotation of the fluid dispersing unit 14b. The disperser 40b extends radially outward from a region of the fluid dispersing unit 14b near the centre. The disperser 40b is hollow in configuration. The disperser 40b stands in fluidic communication with a stirring shaft 38b. The disperser 40b defines a fluid duct 42b with the exit opening 16b.

In a section plane 70b, an outer boundary 72b of the disperser 40b has a semicircular shape at least substantially transversely to a direction of an interior fluid flow 54b through the fluid duct 42b.

The shape of the exit opening 16b when viewed in a direction perpendicular to the principal plane of extension 68b of the exit opening 16b and the shape of the outer boundary 72b of the disperser 40b in the section plane 70b at least substantially transversely to a direction of the interior fluid flow 54b through the fluid duct 42b are substantially the same. It is conceivable that the shape of the exit opening 16b when viewed in a direction perpendicular to the principal plane of extension 68b of the exit opening 16b and the shape of the outer boundary 72b of the disperser 40b in the section plane 70b at least substantially transversely to a direction of the interior fluid flow 54b through the fluid duct 42b are different.

The section plane 70b is oriented at least substantially parallel to the principal plane of extension 68b of the exit opening 16b.

FIG. 5 shows a perspective schematic representation of a fluid dispersing unit 14c of an alternative stirrer device 10c and an optimization unit 18c of the alternative stirrer device 10c with a fluid delivery unit 28c.

In order to avoid needless repetition, the same reference numbers are therefore used for the same assemblies and reference is made to the remarks of FIGS. 1 to 4. In the following, only the details by which the exemplary embodiment of FIGS. 1 to 4 differs from the further alternative exemplary embodiment of FIG. 5 shall be discussed. In order to distinguish the exemplary embodiments, the letter c has been added to the references of the further alternative exemplary embodiment in FIG. 5.

The fluid dispersing unit 14c comprises a turbulence unit 74c. The turbulence unit 74c is shaped as a spiral. The turbulence unit 74c comprises a spiral 76c. It is conceivable for the turbulence unit 74c to have multiple spirals 76c, being coiled in particular in at least one operating state. It is conceivable for multiple spirals 76c to be arranged one beneath the other. It is furthermore conceivable for the spiral 76c to be arranged at least partly on a rod of the fluid dispersing unit 14c.

The turbulence unit 74c is situated in an outer region of the stirrer device 10c viewed along an axis of rotation 12c of the fluid dispersing unit 14c. The turbulence unit 74c is arranged between dispersers 40c.

The turbulence unit 74c is adapted to favour a passage of the fluid into the other fluid. After the fluid emerges from an exit opening 16c, the fluid flows at least partly around the turbulence unit 74c. The turbulence unit 74c generates turbulences and/or shear forces in a near region of the turbulence unit 74c. The turbulences and/or shear forces distribute the fluid.

In the event that the fluid is present as a gaseous phase, the turbulence unit 74c reduces the diameter of primary gas bubbles emerging from the exit opening 16c and/or from an additional exit opening 22c. The turbulence unit 74c breaks up the primary gas bubbles emerging from the exit opening 16c and/or from the additional exit opening 22c into many smaller gas bubbles.

FIG. 6 shows a perspective schematic representation of a fluid dispersing unit 14d of a stirrer device 10d and an optimization unit 18d of the stirrer device 10d with a fluid delivery unit 28d.

In order to avoid needless repetition, the same reference numbers are therefore used for the same assemblies and reference is made to the remarks of FIGS. 1 to 5. In the following, only the details by which the exemplary embodiments of FIGS. 1 to 5 differ from the further alternative exemplary embodiment of FIG. 6 shall be discussed. In order to distinguish the exemplary embodiments, the letter d has been added to the references of the exemplary embodiment in FIG. 6.

By contrast with the exemplary embodiments of FIGS. 1 to 5, the fluid dispersing unit 14d has a symmetry. The fluid dispersing unit 14d comprises six round pipes 78d, which are arranged symmetrically on a circumference of the fluid dispersing unit 14d. Each of the round pipes 78d forms a dispersion cell 56d. Each of the round pipes 78d can be made congruent with the directly following round pipe 78d by a 60° rotation in the direction of rotation 36d. Each of the round pipes 78d can be made congruent with itself by a 360° rotation about the axis of rotation 12d. A fluid exit opening 16d, 22d is arranged at each of the round pipes 78d.

FIGS. 7 and 8 show a fluid dispersing unit 14e of a stirrer device 10e and an optimization unit 18e of the stirrer device 10e with a fluid delivery unit 28e in two schematic perspective views.

In order to avoid needless repetition, the same reference numbers are therefore used for the same assemblies and reference is made to the remarks of FIGS. 1 to 6. In the following, only the details by which the exemplary embodiments of FIGS. 1 to 6 differ from the exemplary embodiment of FIGS. 7 and 8 shall be discussed. In order to distinguish the exemplary embodiments, the letter e has been added to the references of the exemplary embodiment of FIGS. 7 and 8.

The fluid dispersing unit 14e has a symmetry. The fluid dispersing unit 14e comprises six dispersion cells 56e, which are arranged symmetrically on a circumference of the fluid dispersing unit 14e. Each dispersion cell can be made congruent with the directly following dispersion cell 56e by a 60° rotation in the direction of rotation 36e. Each dispersion cell 56e can be made congruent with itself by a 360° rotation about an axis of rotation 12e of the fluid dispersing unit 14e. An exit opening 16e, 22e is arranged at each of the dispersion cells 56e.

Viewed in a direction perpendicular to the axis of rotation 12e, the fluid dispersing unit 14e has the shape of an airfoil profile 80e at least for a section. Viewed at the dispersion cell 56e of the fluid dispersing unit 14e, the fluid dispersing unit 14 has a leading edge 82e facing toward the direction of rotation 36e and a profile trailing edge 84e facing away from the direction of rotation 36e. The leading edge 82e and the profile trailing edge 84 delimit a region of the fluid dispersing unit 14e with the shape of the airfoil profile 80e. Starting from the leading edge 82e, the exit opening 16e extends towards the profile trailing edge 84e and has a semioval cross section.

FIG. 8 shows a further view of the fluid dispersing unit 14e. The optimization unit 18e comprises a blade 24e. The blade 24e is associated to the exit opening 16e. The blade 24e has a curved shape in the direction of rotation 36e. The optimization unit 18e comprises a further blade 86e. The further blade 86e is associated to the exit opening 16e. The further blade 86e is situated at a distance from the blade 24e.

LIST OF REFERENCES

10 Stirrer device
12 Axis of rotation
14 Fluid dispersing unit
16 Exit opening
18 Optimization unit
20 Outside pressure optimization unit
22 Additional exit opening
24 Blade
26 Flow guiding element
28 Fluid delivery unit
30 Area near axis of rotation
32 Vane
34 Stirrer
36 Direction of rotation
38 Stirring shaft
40 Disperser
42 Fluid duct
44 Inlet opening
46 Electric motor
48 Impeller
50 Exterior fluid flow
52 Receiving space
54 Interior fluid flow
56 Dispersion cell
58 Inner pressure optimization unit
60 Additional blade
62 Contour element
64 Baffle
66 Contour unit
68 Principal plane of extension
70 Section plane
72 Outer boundary
74 Turbulence unit
76 Spiral
78 Round pipe
80 Airfoil profile
82 Leading edge
84 Profile trailing edge
86 Additional blade

The invention claimed is:

1. A stirrer device, especially for the mixing of a fluid with at least one other fluid, having at least one fluid dispersing unit able to turn about an axis of rotation, the at least one fluid dispersing unit having at least one exit opening for at least one fluid discharge and comprising at least one disperser, which comprises the at least one exit opening, extends radially outward from a region of the at least one fluid dispersing unit near its centre, is hollow, and defines at least one fluid duct, and the stirrer device comprising at least one optimization unit, which in at least one operating state increases at least a differential pressure at the at least one exit opening, wherein the at least one optimization unit comprises at least one fluid delivery unit, which in the at least one operating state generates an optimized interior fluid flow.

2. The stirrer device according to claim 1, wherein the at least one optimization unit comprises at least one outside pressure optimization unit, which in the operating state reduces at least one outside pressure acting contrary to the at least one fluid discharge.

3. The stirrer device according to claim 1, wherein the at least one fluid dispersing unit has an additional exit opening for at least one additional fluid discharge, which is situated before the at least one exit opening viewed in a direction of rotation of the at least one fluid dispersing unit, wherein the at least one optimization unit in the at least one operating state reduces at least an influencing of the at least one fluid discharge by the at least one additional fluid discharge.

4. The stirrer device according to claim 3, wherein the at least one fluid dispersing unit comprises at least one turbulence unit for influencing the at least one fluid discharge and/or the at least one additional fluid discharge.

5. The stirrer device according to claim 1, wherein the at least one optimization unit in the at least one operating state generates at least one exterior fluid flow which is oriented at least substantially parallel to the axis of rotation of the at least one fluid dispersing unit in at least one flow section.

6. The stirrer device according to claim 5, wherein the at least one optimization unit comprises at least one blade able to turn about the axis of rotation of the at least one fluid dispersing unit for an at least partial generating of the at least one exterior fluid flow.

7. The stirrer device according to claim 6, wherein the at least one blade is associated to the at least one exit opening.

8. The stirrer device according to claim 7, wherein the at least one blade is associated to the at least one exit opening and the at least one blade is situated with an offset from the at least one exit opening, viewed along the axis of rotation.

9. The stirrer device according to claim 6, wherein the at least one optimization unit comprises at least one further shorter blade associated to the at least one exit opening, which is situated at a distance from the at least one blade.

10. The stirrer device according to claim 1, wherein the at least one optimization unit comprises at least one flow guiding element for deflecting the at least one exterior fluid flow in a direction at least substantially perpendicular to the axis of rotation of the at least one fluid dispersing unit.

11. The stirrer device according to claim 1, wherein the at least one optimization unit comprises at least one inner pressure optimization unit, which in the operating state increases at least an inner pressure favouring the at least one fluid discharge.

12. The stirrer device according to claim 1, wherein the at least one fluid delivery unit delivers the fluid in the at least one operating state from at least one area near the axis of rotation of the at least one fluid dispersing unit at least partly radially outward towards the at least one exit opening.

13. The stirrer device according to claim 12, wherein the at least one fluid delivery unit comprises at least one vane which has a curved shape when viewed in a direction parallel to the axis of rotation and which delivers the fluid in the at least one area near the axis of rotation at least substantially parallel to the axis of rotation of the at least one fluid dispersing unit.

14. The stirrer device according to claim 1, wherein the at least one fluid delivery unit is arranged entirely inside the at least one fluid dispersing unit.

15. The stirrer device according to claim 1, wherein surfaces of the at least one fluid delivery unit making contact with the fluid are formed at least substantially smooth and/or free of edges.

16. The stirrer device according to claim 1, wherein the at least one fluid dispersing unit comprises at least one round pipe arranged substantially perpendicular to the axis of rotation, on which the at least one exit opening is arranged.

17. The stirrer device according to claim 1, wherein the at least one fluid dispersing unit viewed in at least one direction perpendicular to the axis of rotation has a shape of an airfoil profile at least for a portion.

18. A stirrer having at least one stirrer device according to claim 1.

19. The stirrer device according to claim 1, wherein the at least one fluid delivery unit is fashioned as a turbine.

20. The stirrer device according to claim 1, wherein the at least one fluid delivery unit is situated at the center of the at least one fluid dispersing unit, when viewed in a direction parallel to the axis of rotation.

21. The stirrer device according to claim 1, wherein the at least one fluid dispersing unit comprises at least two dispersion cells, which are arranged symmetrically in regard to the axis of rotation, on a circumference of the at least one fluid dispersing unit, and on each of which a selected exit opening of the at least one exit openings is arranged.

22. The stirrer device according to claim 21, wherein each dispersion cell of the at least two dispersion cells of the at least one fluid dispersing unit, has a leading edge facing toward a direction of rotation and a profile trailing edge facing away from the direction of rotation, wherein, starting from the leading edge, the selected exit opening of the at least one exit openings extends towards the profile trailing edge and has a semioval cross section.

23. The stirrer device according to claim 1, wherein the at least one disperser is curved in shape in a plane of rotation of the at least one fluid dispersing unit.

* * * * *